United States Patent [19]
Welstead, Jr. et al.

[11] 3,846,477
[45] Nov. 5, 1974

[54] 2-ALKYLAMINO BENZOPHENONES

[75] Inventors: William John Welstead, Jr.; Harold Fisher Stauffer, Jr., both of Richmond, Va.

[73] Assignee: A. H. Robins Company, Incorporated, Richmond, Va.

[22] Filed: Sept. 20, 1972

[21] Appl. No.: 290,568

[52] U.S. Cl. ... 260/482 C, 260/307 C, 260/556 AR, 260/570 AB, 424/272, 424/300, 424/330
[51] Int. Cl. .......................................... C07d 125/06
[58] Field of Search ................................ 260/482 C

[56] References Cited
UNITED STATES PATENTS
3,622,618   11/1971   Duennenberger et al. ...... 260/471 C
3,755,358   8/1973   Topliss............................ 260/326 N

*Primary Examiner*—G. Thomas Todd

[57] ABSTRACT

Novel 2-alkylaminobenzophenones are described having the formula:

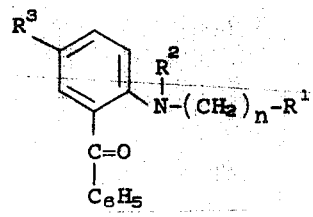

wherein;

$R^1$ is hydroxyl, 1,2-dihydroxyethyl, O-sulfate sodium salt, carbamoyloxy, N-lower-alkyl-carbamoyloxy, N,N-di-lower-alkyl-carbamoyloxy, 2-oxazolidinon-5-yl, and 3-lower-alkyl-2-oxazolindinon-5-yl, $R^2$ is hydrogen, lower-alkyl and carbethoxy, $R^3$ is halogen, hydrogen, alkoxy, nitro and trifluoromethyl, and $n$ is zero, one and two.

The compounds have mild CNS depressant tranquilizing and pepsin inhibition activities.

4 Claims, No Drawings

2-ALKYLAMINO BENZOPHENONES

The present invention relates to novel 2-aminobenzophenones and is particularly concerned with 2-alkylamino-5-substituted benzophenones, compositions thereof and methods of making and using same.

The invention is especially concerned with novel compounds having the formula:

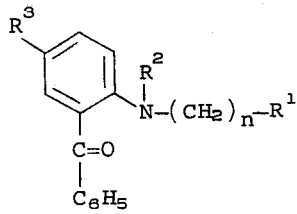

Formula I wherein;

$R^1$ is hydroxyl, 1,2-dihydroxyethyl, 0-sulfate-sodium salt, carbamoyloxy, N-lower-alkyl, and N,N-di-lower-alkyl-carbamoyloxy, 2-oxazolidinone-5-yl and 3-lower-alkyl-2-oxazolidinone-5-yl, $R^2$ is hydrogen, lower-alkyl and carbethoxy, $R^3$ is halogen, hydrogen, alkoxy, nitro and trifluoromethyl, and $n$ is zero, one and two.

The novel compounds of the present invention exhibit mild pharmacological CNS depressant activity as determined by neuropharmacological profile in mice using the method of Irwin, S. (Nodine, H. and Siegler, P. E. (eds.): Animal and Clinical Pharmacologic Techniques in Drug Evaluation, Vol. I, pp. 36–54). Certain of the compounds are useful as tranquilizing agents. They are active in mice and rats in intraperitoneal doses of 5–50 mg./kg. when evaluated in the standard test procedure in which animals are administered a compound and observed for behavioral effects. Compounds of the invention preferred for their tranquilizing action are 5-chloro-2-[N-(2,3-dihydroxypropyl)-N-methylamino]benzophenone and 5-chloro-2-[N-carbethoxy-N-(2-hydroxyethyl)]aminobenzophenone. Some of the compounds also exhibit inhibition of pepsin proteolysis useful in gastroenterology as determined by the method of Mett (Hawk, B. P., Oser, B. L., and Summerson, W. H.: Practical Physiological Chemistry, McGraw-Hill, New York, 1951 p. 374).

"Lower-alkyl" as used in the foregoing Formula I and where it appears elsewhere throughout the specification and claims thereof includes straight and branched chain radicals of up to eight carbon atoms inclusive and is exemplified by groups such as methyl, ethyl, propyl, isopropyl, butyl, isobutyl, amyl, isoamyl, hexyl, heptyl, octyl, and the like.

The starting materials of Formula II for preparing the compounds of Formula I are the tosylamidobenzophenone derivatives of the 5-substituted 2-aminobenzophenones which are prepared according to the method described by Bell, S. C. et al., J. Org. Chem. 27, 562–566 (1962).

The following Chart I illustrates the synthetic methods used to prepare the compounds of the invention represented in Formula I.

CHART I

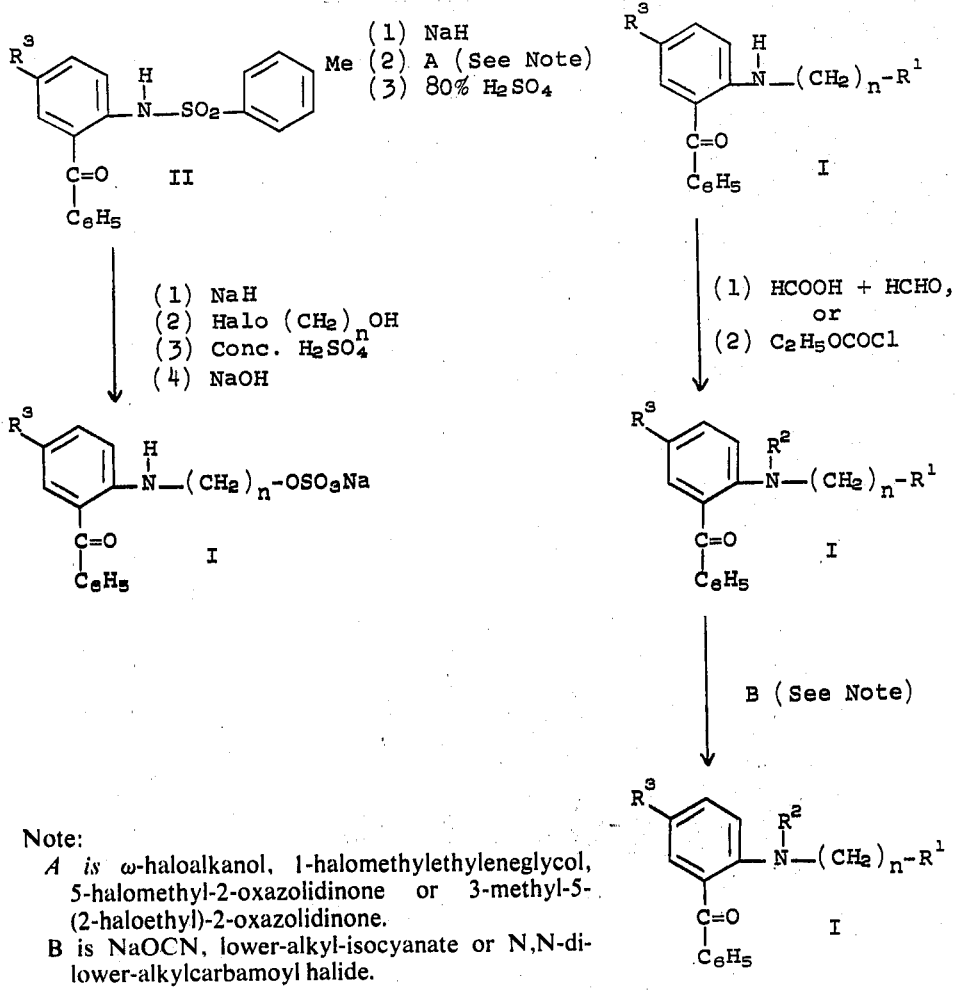

Note:

A is ω-haloalkanol, 1-halomethylethyleneglycol, 5-halomethyl-2-oxazolidinone or 3-methyl-5-(2-haloethyl)-2-oxazolidinone.

B is NaOCN, lower-alkyl-isocyanate or N,N-di-lower-alkylcarbamoyl halide.

Compounds of Formula I wherein $R^2$ is hydrogen are prepared by reacting a compound of Formula II successively with sodium hydride and a compound having a reactive halide and then hydrolyzing the mixture using 80% sulfuric acid to remove the tosyl moiety. When one of the reactants is an ω-haloalkanol, substitution of concentrated sulfuric acid in the hydrolysis step for 80% sulfuric acid followed by neutralization of the hydrolysis mixture leads to the sulfonation of the alcohol and the O-sulfate alkali metal salt.

The preparation of compounds wherein $R^2$ is methyl is accomplished by reacting the secondary amine with formaldehyde and formic acid. Similarly, compounds wherein $R^2$ is carbethoxy are prepared by reacting the secondary amine with ethyl chlorocarbonate.

Compounds wherein $R^2$ is methyl and $R^1$ is hydroxyl can be further reacted with cyanates and lower-alkylcarbamoyl chlorides to produce compounds of Formula I wherein $R^1$ is carbamoyloxy, N-lower-alkyl-carbamoyloxy and N,N-di-lower-alkyl-carbamoyloxy.

The following examples are presented to illustrate the preparation of compounds of the present invention and they should not be construed as limiting it in spirit or in scope.

Example 1

5-Chloro-2-(2-hydroxyethyl)aminobenzophenone

To 12 g. (0.26 mole) of 54% sodium hydride in mineral oil and 200 ml. of dried dimethylformamide was added 100 g. (0.26 mole) of 5-chloro-2-tosylamidobenzophenone prepared from 2-amino-5-chlorobenzophenone in 100 ml. of dried dimethylformamide. After the evolution of hydrogen ceased, the mixture was stirred for an additional hour followed by the addition of 33 g. (0.26 mole) of 2-bromoethanol. The resulting mixture was heated while stirring at 95°C. for 12 hours. The reaction mixture was then poured into one liter of water and extracted with benzene. The extracts were dried over magnesium sulfate and concentrated on a rotating evaporator. The resulting oil was dissolved in 300 ml. of 80% sulfuric acid and heated on a steam bath for one hour. The mixture, after being cooled, was extracted with petroleum ether to remove the mineral oil then neutralized with 6N sodium hydroxide. The resulting product was extracted into benzene, dried over magnesium sulfate, then evaporated to an oil. The product crystallized on standing and was recrystallized from ligroin, yielding 26 g. (35%) of product; melting at 81–83°C.

| Analysis | Calculated for $C_{15}H_{14}ClNO_2$ | : C,65.34; H,5.12; N,5.08 |
|---|---|---|
| | Found | : C,65.13; H,5.03; N,5.19 |

Using the procedure of Example 1 and replacing 5-chloro-2-tosylamidobenzophenone with
2-tosylamidobenzophenone,
5-methoxy-2-tosylamidobenzophenone,
5-nitro-2-tosylamidobenzophenone, and
5-trifluoromethyl-2-tosylamidobenzophenone,
there are obtained 2-(2-hydroxyethylamino)-benzophenone,
5-methoxy-2-(2-hydroxyethylamino)-benzophenone,
5-nitro-2-(2-hydroxyethylamino)-benzophenone, and
5-trifluoromethyl-2-(2-hydroxyethylamino)benzophenone.

Example 2

5-Chloro-2-(2-hydroxyethyl)aminobenzophenone, O-sulfate sodium salt

A stirred mixture of 50 g. (0.13 mole) of 5-chloro-2-tosylamidobenzophenone in 50 ml. of dimethylformamide was added dropwise to a mixture of 6 g. (0.13 mole) of sodium hydride (54% in mineral oil) in 100 ml. of dimethylformamide. After hydrogen evolution had ceased and the mixture was treated with 16.5 g. (0.13 mole) of bromoethanol and heated at 80–90°C. overnight, the mixture was poured into water and the resulting gummy solid was dissolved in 200 ml. of concentrated $H_2SO_4$, heated on a steam bath for 30 minutes, then diluted with 500 ml. of water. The resulting gum was extracted with low boiling petroleum ether to remove the mineral oil, then the mixture was made alkaline with 6N sodium hydroxide. A benzene extraction gave an emulsion which broke on addition of several ml. of methanol. Evaporation of the extract gave 10 g. of crude starting material. The aqueous layer was re-extracted with benzene and 5 ml. of butanol was used to break the emulsion. Three layers formed. The viscous middle layer was separated and triturated with benzene to yield a solid. Recrystallization from 95% alcohol gave 27 g. (51%) of water soluble product which melted above 180°C. with decomposition. The undried sample analyzed as a hydrate.

| Analysis: | Calculated for $C_{15}H_{13}ClNaNO_5S$ | : C,47.69; H,3.47; N,3.71 |
|---|---|---|
| | Found | : C,47.15; H,3.59; N,3.79 |
| | Calculated for $C_{15}H_{15}ClNaNO_6S$ (Hydrate) | : C,45.52; H,3.82; N,3.54 |
| | Found | : C,44.78; H,3.70; N,3.50 |

Using the procedure of Example 2 and replacing 5-chloro-2-tosylamidobenzophenone with equal molar amount of
2-tosylamidobenzophenone,
5-methoxy-2-tosylamidobenzophenone,
5-nitro-2-tosylamidobenzophenone,
5-trifluoromethyl-2-tosylamidobenzophenone,
there are obtained
2-(2-hydroxymethyl)amino-benzophenone O-sulfate sodium salt,
5-methoxy-2-(2-hydroxymethyl)amino benzophenone O-sulfate sodium salt,
5-nitro-2-(2-hydroxymethyl)amino benzophenone O-sulfate sodium salt,
5-trifluoromethyl-2-(2-hydroxymethyl)aminobenzophenone O-sulfate sodium salt.

Example 3

5-Chloro-2-(2,3-dihydroxypropylamino)benzophenone.

A solution of 39 g. (0.1 mole) of 5-chloro-2-tosylamidobenzophenone in 40 ml. of dimethylformamide was added to a suspension of 2.6 g. (0.11 mole) of sodium hydride in 70 ml. of dimethylformamide. After the evolution of hydrogen ceased, the mixture was stirred for an additional half hour. To the reaction mixture was added 11 g. (0.1 mole) of 3-chloropropane-1,2-diol in 40 ml. of dimethylformamide and the mixture was heated at 90°C. with stirring for 72 hours. The mixture was poured into water and extracted with benzene. The benzene extracts were dried over magnesium sulfate and concentrated under reduced pressure. The resulting oil was then dissolved in 500 ml. of 80% sulfuric acid and heated on a steam bath for 4 hours. After cooling, the acid mixture was carefully neutralized with 6N sodium hydroxide and extracted with benzene. The benzene extracts were washed with water, dried over magnesium sulfate and evaporated under reduced pressure to an oil. The crude oil (14 g.) was placed on a 400 g. magnesium silicate column and eluted with benzene-acetone. The purified product, 4.5 g. (15%) solidified on standing and was recrystallized from ethyl-ether, m.p. 118–120°C.

| Analysis: | Calculated for $C_{16}H_{16}ClNO_3$ | : C,62.85; H,5.27; N,4.58 |
|---|---|---|
| | Found | : C,63.46; H,5.30; N,4.77 |

Example 4
5-Chloro-2-(2-oxazolidinon-5-ylmethylamino)-benzophenone

To a stirred mixture of 1.3 g. (0.05 mole) of sodium hydride in 20 ml. of dimethylformamide was added 20 g. (0.05 mole) of 5-chloro-2-tosylamidobenzophenone in 20 ml. of dimethylformamide. After the evolution of hydrogen had subsided, 9.4 g. (0.05 mole) of 5-bromomethyl-2-oxazolidinone was added and the mixture was stirred at 80–90°C. for 24 hours. The mixture was poured into water and the resulting gummy solid was filtered off and redissolved in 100 ml. of concentrated sulfuric acid. After stirring 1 hour, the mixture was cooled and made basic with 3N sodium hydroxide. The product was extracted from the mixture with benzene and the extract was dried over magnesium sulfate and evaporated to an oil (14 g.). Chromatography on 300 g. of 60–100 mesh magnesium silicate using benzene-acetone to elute gave 7 g. (59%) of solid which melted at 157–159°C. after recrystallization from benzene-isooctane.

| Analysis: | Calculated for $C_{17}H_{15}ClN_2O_3$ | : C,61.73; H,4.57; N,8.47 |
|---|---|---|
| | Found | : C,61.66; H,4.58; N,8.47 |

Example 5
5-Chloro-2-[2-(3-methyl-2-oxazolidinon-5-yl)ethylamino]benzophenone To 0.06 mole of sodium hydride in 40 ml. of dimethylformamide at 0°C. was added dropwise 20 g. (0.052 mole) of 5-chloro-2-tosylamidobenzophenone in 20 ml. of dimethylformamide. After evolution of hydrogen had ceased, the mixture was warmed to room temperature and treated with 8.5 g. (0.502 mole) of 3-methyl-5-(2-chloroethyl)-2-oxazolidinone in 20 ml. of dimethylformamide. The reaction mixture was heated at 90°C. with stirring for 12 hours, then poured into water. The product was extracted into benzene and the extract was evaporated to yield 16 g. of oil. The oil was dissolved in 100 ml. of concentrated sulfuric acid by warming; then the mixture was cooled, made basic with 3N sodium hydroxide and the product extracted into benzene. After drying over magnesium sulfate, the benzene extracts were chromatographed on 400 g. of magnesium silicate using benzene-acetone to elute. From the column, 5 g. (23%) of pure oily product was obtained. A sample was molecularly distilled for analysis.

| Analysis: | Calculated for $C_{19}H_{19}ClN_2O$ | : C,63.42; H,5.60; N,7.79 |
|---|---|---|
| | Found | : C,63.68; H,5.57; N,7.84 |

Example 6
5-Chloro-2-[N-(2-hydroxyethyl)-N-methylamino]benzophenone.

To 11 g. (0.2 mole) of 97% formic acid solution at 0°C. was added 20 g. (0.07 mole) of 5-chloro-2-(2-hydroxyethyl)aminobenzophenone followed by 10.5 ml. (0.14 mole) of 37% formaldehyde solution. The mixture was heated for 14 hours at reflux temperature, after which time the mixture was cooled and poured into 200 ml. of water and extracted with benzene. The benzene extracts were dried over magnesium sulfate and evaporated to an oil. The crude oil (16 g.) was chromatographed on a 400 g. column of magnesium silicate (60–100 mesh) and eluted with benzene containing increasing amounts of acetone. From the column, 9.5 g. (47%) of product was isolated. A sample was molecularly distilled for analysis.

| Analysis: | Calculated for $C_{16}H_{16}ClNO_2$ | : C,66.32; H,5.57; N,4.83 |
|---|---|---|
| | Found | : C,66.30; H,5.60; N,4.94 |

Using the procedure of Example 6 and replacing 5-chloro-2-(2-hydroxyethyl)amine benzophenone with
2-(2-hydroxyethyl)aminobenzophenone, and
5-methoxy-2-(2-hydroxyethyl)aminobenzophenone, there are obtained
2-[N-(2-hydroxyethyl)-N-methylamino]benzophenone, and
5-methoxy-2-[N-(2-hydroxyethyl)-N-methylamino]benzophenone.

Example 7
5-Chloro-2-(N-2,3-dihydroxypropyl-N-methylamino)benzophenone.

A mixture of 16 g. (0.052 mole) of 5-chloro-2-(2,3-dihydroxypropylamino)benzophenone and 13.4 g.

(0.26 mole) of formic acid was heated until all the starting material dissolved. The mixture was cooled, treated with 7.05 g. (0.157 mole) of 37% formaldehyde solution and then heated to reflux. After refluxing overnight, the mixture was cooled, poured into water and extracted with benzene. The benzene extracts were dried over magnesium sulfate and evaporated to an oil. The crude oil was chromatographed on 400 g. of 60–100 mesh magnesium silicate and eluted with acetonebenzene. The yield of purified oil was 11.5 g. (69%). The sample was molecularly distilled for analysis.

Analysis: Calculated for $C_{17}H_{18}ClNO_3$ : C,63.85; H,5.67; N,4.38
Found : C,63.54; H,5.64; N,4.39

Example 8

5-Chloro-2-[N-methyl-N-2-(3-methyl-2-oxazolidinon-5-yl)ethylamino]-benzophenone

A mixture of 8 g. (0.02 mole) of 5-chloro-2-[2-(3-methyl-2-oxazolidinone-5-yl)ethylamino]benzophenone and 5.1 g. (0.09 mole) of 89% formic acid solution was heated until all the starting material dissolved. The mixture was cooled and treated with 8 ml. (0.067 mole) of 37% formaldehyde solution. After refluxing for 18 hours, the reaction mixture was cooled, poured into water and extracted with benzene. The benzene extracts were washed with water, dried over magnesium sulfate and evaporated to an oil. The crude oil was dissolved in ether, treated with ethereal HCl and the resulting solid was triturated several times with dry ether. The purified salt was converted back to the free base and molecularly distilled for analysis. The yield of purified product was 5 g. (60%).

Analysis: Calculated for $C_{20}H_{21}ClN_2O_3$ : C,64.42; H,5.68; N,7.51
Found : C,64.00; H,5.73; N,7.39

Example 9

5-Chloro-2-[N-Carbethoxy-N-(2-hydroxyethyl)-]aminobenzophenone

A solution of 12 g. (0.043 mole) of 2-(2-hydroxyethylamino)-5-chlorobenzophenone in 50 ml. of water and 25 ml. of dioxane was treated with 10 g. (0.1 mole) of ethyl chlorocarbonate and stirred for 24 hours. The mixture was treated with excess 3N sodium hydroxide and extracted with ethylacetate. The extracts were dried over magnesium sulfate and evaporated to an oil which was taken up into benzene. The benzene mixture was chromatographed on 200 g. column of 60–100 mesh magnesium silicate eluting with benzene-acetone. The yield of oil from the column was 5.5 g.(37%).

Analysis: Calculated for $C_{18}H_{18}ClNO_4$ : C,62.16; H,5.22; N,4.03
Found : C,62.77; H,5.18; N,3.86

Example 10

5-Chloro-2-[N-(2-carbamoyloxyethyl)-N-methylamino]benzophenone

A slowly stirred mixture of 7 g. (0.024 mole) of 5-chloro-2-[N-(2-hydroxyethyl)-N-methyl]aminobenzophenone and 3.15 g. (0.05 mole) of sodium cyanate and 50 ml. of methylene chloride was treated dropwise with 4.3 g. (0.05 mole) of trifluoroacetic acid. After stirring overnight at room temperature, an additional 1.57 g. (0.025 mole) of sodium cyanate and 2.15 g. (0.025 mole) of trifluoroacetic acid was added and the mixture was allowed to stir an additional 12 hours. The mixture was filtered and the filtrate was washed with water, dried over magnesium sulfate and evaporated to an oil. The crude oil was chromatographed on 200 g. of 60–100 mesh magnesium silicate and eluted with benzene-acetone. Yield of purified product was 3 g. (38%). A sample was molecularly distilled for analysis.

Analysis: Calculated for $C_{17}H_{17}ClN_2O_3$ : C,61.35; H,5.15; N,8.42
Found : C,60.79; H,5.17; N,8.03

Example 11

5-Chloro-2-[N-(2-dimethylcarbamoyloxyethyl)-N-methylamino]benzophenone

A mixture of 4 g. (0.014 mole) of 5-chloro-2-[(N-2-hydroxyethyl)-N-methyl]aminobenzophenone and 1.5 g. (0.014 mole) of dimethylcarbamoyl chloride in 25 ml. of pyridine was refluxed for 24 hours. The mixture was poured into water, acidified with concentrated hydrochloric acid and extracted with benzene. The benzene extracts were washed with water, dried over magnesium sulfate and evaporated to an oil. The crude oil was chromatographed on 175 g. of 60–100 mesh magnesium silicate and eluted with benzene-acetone. The yield of purified product was 3.5 g. (65%). A sample was molecularly distilled for analysis.

Analysis: Calculated for $C_{19}H_{21}ClN_2O_3$ : C,63.24; H,5.87; N,7.76
Found : C,63.05; H,5.87; N,7.46

Using the procedure of Example 11 and replacing 5-chloro-2-[(N-hydroxyethyl)-N-methyl]aminobenzophenone with
2-[N-(2-hydroxyethyl)-N-methylamino]benzophenone, and
5-methoxy-2-[N-(2-hydroxyethyl)-N-methyl-amino]benzophenone,
there are obtained
2-[N-(2-dimethylcarbamoyloxyethyl-N-methylamino]benzophenone, and
5-methoxy-2-[N-(2-dimethylcarbamoyloxyethyl)-N-methylamino]benzophenone.

What is claimed is:
1. A compound selected from 2-alkylaminobenzophenones having the formula:

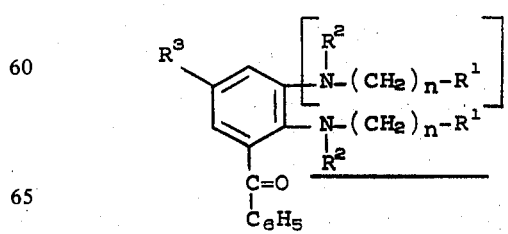

wherein:

$R^1$ is selected from carbamoyloxy, lower-alkyl-carbamoyloxy, and di-loweralkyl-carbamoyloxy, $R^2$ is selected from hydrogen, lower-alkyl and carbethoxy, $R^3$ is selected from halogen, hydrogen, methoxy, nitro and trifluoromethyl, and $n$ is selected from zero, one and two.

2. A compound of claim 1 which is 5-chloro-2-[N-(2-carbamoyloxyethyl)-N-methylamino]benzophenone.

3. A compound of claim 1 which is 5-chloro-2-[N-(2-dimethylcarbamoyloxyethyl)-N-methylamino]benzophenone.

4. A compound of claim 1 which is 5-chloro-2-[N-(2-butylcarbamoyloxyethyl)-N-methylamino]benzophenone.

* * * * *

UNITED STATES PATENT OFFICE
CERTIFICATE OF CORRECTION

Patent No. 3,846,477           Dated Nov. 5, 1974

Inventor(s) William J. Welstead, Jr. and Harold F. Stauffer, Jr.

It is certified that error appears in the above-identified patent and that said Letters Patent are hereby corrected as shown below:

Column 8, lines 56 to 66, formula should appear as shown below instead of as in the patent:

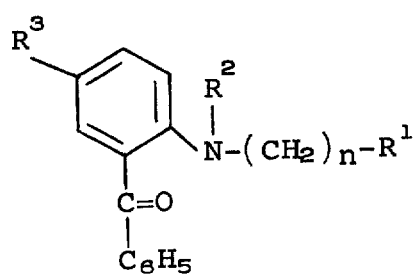

Signed and Sealed this

*seventh* Day of *October 1975*

[SEAL]

Attest:

RUTH C. MASON
*Attesting Officer*

C. MARSHALL DANN
*Commissioner of Patents and Trademarks*